(12) United States Patent
Shimizu et al.

(10) Patent No.: US 6,389,081 B1
(45) Date of Patent: May 14, 2002

(54) SIGNAL TRANSMISSION EQUIPMENT

(75) Inventors: Satoru Shimizu; Eiichiro Kawakami; Atsuhiko Sugitani; Kiyohito Tokuda, all of Tokyo (JP)

(73) Assignee: Oki Electric Industry CO, Ltd., Tokyo (JP)

( * ) Notice: Subject to any disclaimer, the term of this patent is extended or adjusted under 35 U.S.C. 154(b) by 0 days.

(21) Appl. No.: 09/468,919

(22) Filed: Dec. 22, 1999

(30) Foreign Application Priority Data

Dec. 24, 1998 (JP) .......................................... 10-367337

(51) Int. Cl.[7] .............................................. H04L 27/20
(52) U.S. Cl. ........................ 375/308; 375/279; 332/103
(58) Field of Search ................................. 375/308, 261, 375/279, 280, 281, 298; 332/103

(56) References Cited

U.S. PATENT DOCUMENTS 5,193,222 A * 3/1993 Sasaki ......................... 455/102
5,696,795 A * 12/1997 Williams et al. ............. 375/308

OTHER PUBLICATIONS

"TDMA TSUSHIN", Japanese–language Publication, pp. 85–87, Apr. 5, 1989, issued by IEICE.

"KIHON DENSHI KAIRO", Japanese–language Publication, pp. 87–96, Jan. 10, 1984, issued by Institute of Electrical Engineers.

* cited by examiner

*Primary Examiner*—Temesghen Ghebretinsae
(74) *Attorney, Agent, or Firm*—Rabin & Berdo, P.C.

(57) ABSTRACT

The signal transmission equipment is comprised such that a signal point does not cross the origin of the constellation by selecting signals to be input to the QPSK modulator, and the positions of the signal points in the constellation.

6 Claims, 8 Drawing Sheets

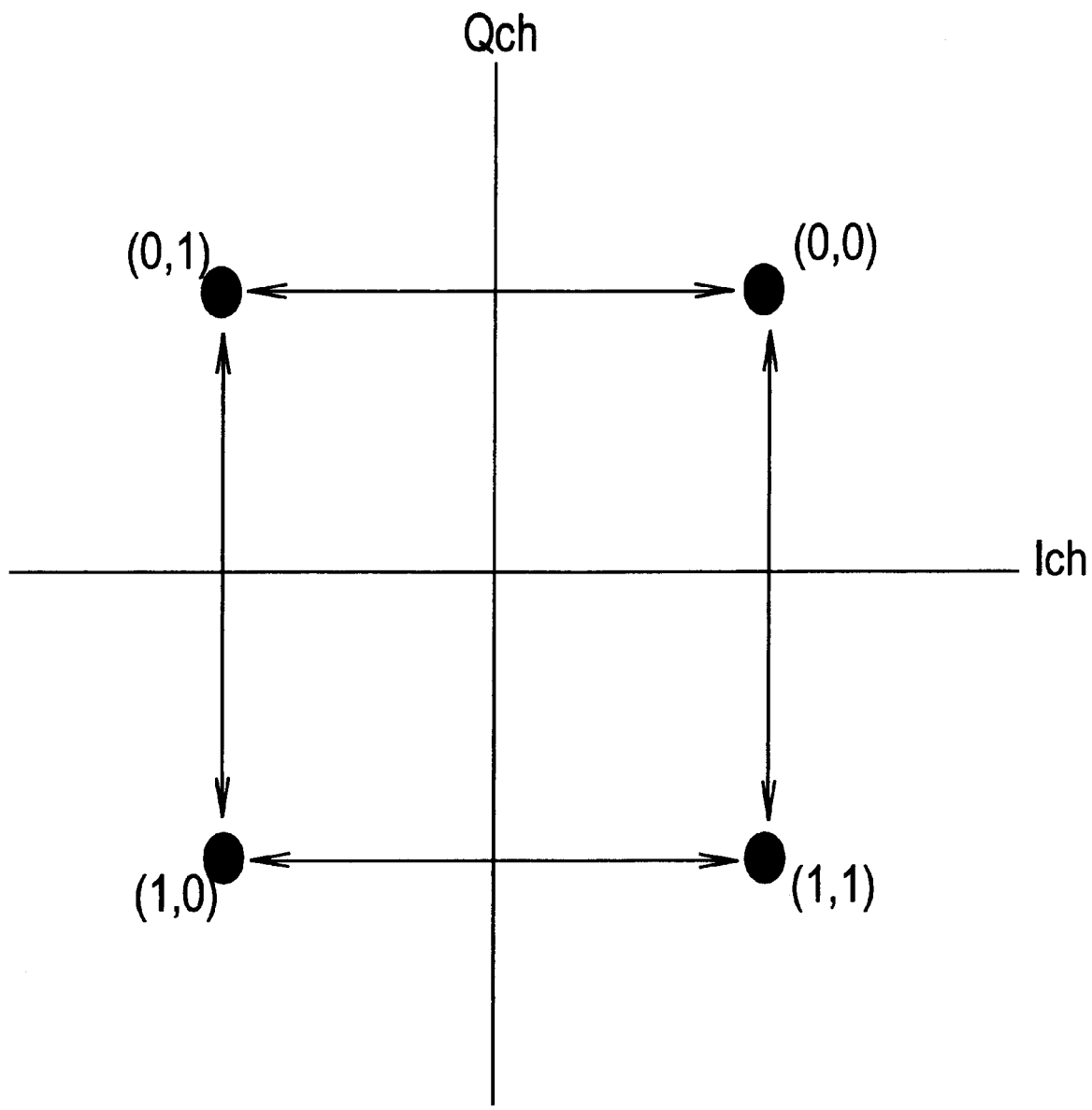

SIGNAL TRANSMISSION EQUIPMENT

BACKGROUND OF THE INVENTION

1. Field of the Invention

The present invention relates to a signal transmission equipment which modulates and transmits signals accompanying clock information, such as the signals of the DS-Link (Distributed System-Link) system which is used the IEEE 1394 standard, for example.

2. Description of Related Art

In digital data transmission, it is necessary to transmit not only data signals but also clock signals for indicating timing to judge the data. To transmit clock signals, there is a method to transmit clock signals from the transmission side to the receive side along with data signals, and a method to generate clock signals at the receive side.

The DS-Link system is a method of transmitting clock signals from the transmission side to the receive side along with data signals. In the DS-Link system, two signals, that is, a data signal and strobe signal, are transmitted in parallel. To transmit such signals via radio transmission, signals must be modulated. For the modulation method, multi-value modulation, which transmits 2-bit information in one time slot (unit time), such as QPSK (Quadrature Phase Shift Keying) and 4-value FM, is usually used.

Another known method is to execute parallel/serial conversion so as to convert two signals to one signal, after which the signal is then transmitted.

Document 1 ("TDMA TSUSHIN", pp. 85–87, Apr. 5, 1989, issued by IEICE) disclosed a method of transmitting only data signals using multi-value modulation, and generating clock signals from data signals at the receive side. Such a method is generally used in radio transmission.

To execute the above mentioned multi-value modulation, either amplitude modulation, frequency modulation or phase modulation is used. Normally phase modulation is more frequently used since the deterioration of signals due to the influence of fading is large in amplitude modulation, and circuits become complicated if frequency modulation is used. In phase modulation, however, the positions of signal points (phase status) in a phase diagram (called a constellation) may shift, crossing the origin of the phase diagram as signals change. In a phase diagram, as FIG. 5 shows, the same phase of the carrier wave is mapped on the true axis (Ich), and the opposite phase of the carrier wave is mapped on the false axis (Qch). In the phase diagram, signal points (0, 0), (0, 1) (1, 1) and (1, 0) are positioned on the first to fourth quadrant respectively in this sequence, and the arrows in the phase diagram show the change of the signal points when the content of the signal changes. In the phase diagram, the distance between a signal point and the origin corresponds to the amplitude (power) of the signal. If a signal point shifts, crossing the origin in the phase diagram when the signal changes, this means that the signal has changed from a high amplitude status to a low amplitude status near the origin then back to a high amplitude status. Therefore, in order to accurately transmit this change of the amplitude between the transmitter and receiver, linear characteristics are demanded for both the transmitter and receiver. However, as Document 2 ("KIHON DENSHI KAIRO", pp. 87–96, Jan. 10, 1984, issued by the Institute of Electrical Engineers) states, a linear amplifier (class A amplifier) has poor power efficiency.

Also in the case of the method of executing parallel/serial conversion, data signals and strobe signals are actually superimposed for transmission, therefore two times the transmission speed is required. This also makes it necessary to double the width of the frequency band.

In the case of the method for generating clock signals at the receive side, on the other hand, a clock generation circuit is necessary. Also a portion called the "preamble", which is sufficient for the clock signal lead-in-time, must be added at the beginning of the transmission signal, which deteriorates the transmission efficiency. Especially when transmitting short burst signals at high-speed, the deterioration of transmission efficiency due to a preamble is a problem which cannot be ignored.

SUMMARY OF THE INVENTION

With the foregoing in view, it is an object of the present invention to provide a signal transmission equipment whereby good transmission quality can be obtained even if the linear characteristics of the transmitter/receiver are insufficient.

To achieve this object, the signal transmission equipment of the present invention has the following unique configuration. That is, the signal transmission equipment of the present invention comprises a transmitter and receiver. According to the present invention, the transmitter comprises a QPSK modulator. Also, according to the present invention, the QPSK modulator generates a modulation signal, including 2-bit digital information per unit time, which is formed based upon a first and second signal to be input. The modulation signal is output from the QPSK modulator. Also, according to the present invention, the receiver comprises a QPSK demodulator and an exclusive-or circuit. Also, according to the present invention, the QPSK demodulator converts the modulation signal sent from the transmitter to the first and second signals, and outputs therefrom the first and second signals. Also, according to the present invention, the exclusive-or circuit outputs a third signal, which is an exclusive-or of the first and second signals sent from the QPSK demodulator.

According to a preferred embodiment of the present invention, a change of the digital information which the first signal has, and a change of the digital information which the second signal has, occurs non-simultaneously.

For the embodiment of the present invention, it is preferable that the first signal is a data signal and the third signal is a clock signal.

According to another preferred embodiment of the present invention, the modulation signal is transmitted from the transmitter to the receiver by being irradiated into the air as electromagnetic waves.

According to still another preferred embodiment of the present invention, the modulation signal is transmitted from the transmitter to the receiver via optical fibers.

Another signal transmission equipment of the present invention has the following unique configuration. That is, the signal transmission equipment of the present invention comprises a transmitter and a receiver. According to the present invention, the transmitter comprises a QPSK modulator. Also, according to the present invention, the QPSK modulator generates a modulation signal, including 2-bit digital information per unit time, which is formed based upon a first and second signal to be input. The modulation signal is output from the QPSK modulator. Also, according to the present invention, the receiver comprises a QPSK demodulator. Also, according to the present invention, the QPSK demodulator converts the modulation signal, which is sent from the transmitter, to the first and second signals and outputs therefrom the first and second signals. Also, according to the present invention, in the QPSK modulator and QPSK demodulator, signal points (0, 0), (0, 1), (1, 0) and (1, 1) are positioned from the first quadrant to the fourth quadrant sequentially as binary numbers in a phase diagram, where the abscissa denotes a level of the first signal and the ordinate denotes a level of the second signal.

According to a preferred embodiment of the present invention, the first signal is a data signal and the second signal is a clock signal.

According to another preferred embodiment of the present invention, the modulation signal is transmitted from the transmitter to the receiver by being irradiated into the air as electromagnetic waves.

According to still another preferred embodiment of the present invention, the modulation signal is transmitted from the transmitter to the receiver via optical fibers.

Another signal transmission equipment of the present invention has the following unique configuration. That is, a signal transmission equipment of the present invention comprises a transmitter and receiver. According to the present invention, the transmitter comprises a QPSK modulator and a first exclusive-or circuit. Also, according to the present invention, the first exclusive-or circuit outputs therefrom a third signal which is an exclusive-or of a first and second signal to be input. Also, according to the present invention, the QPSK modulator generates a modulation signal, including 2-bit digital information per unit time, which is formed based upon the first signal and third signal sent from the first exclusive-or circuit. The modulation signal is output from the QPSK modulator. Also, according to the present invention, the receiver comprises a QPSK demodulator and a second exclusive-or circuit. Also, according to the present invention, the QPSK demodulator converts the modulation signal, which is sent from the transmitter, to the first and third signals, and outputs therefrom the first and third signals. Also, according to the present invention, the second exclusive-or circuit outputs therefrom the second signal, which is an exclusive-or of the first and third signals sent from the QPSK demodulator.

According to a preferred embodiment of the present invention, the change of a value of digital information which the first signal has, and the change of a value of digital information which the third signal has, occurs non-simultaneously.

According to another preferred embodiment of the present invention, the first signal is a data signal and the second signal is a clock signal.

According to still another preferred embodiment of the present invention, the modulation signal is transmitted from the transmitter to the receiver by being irradiated into the air as electromagnetic waves.

According to still another preferred embodiment of the present invention, the modulation signal is transmitted from the transmitter to the receiver via optical fibers.

The receiver of the present invention has the following unique configuration. That is, the receiver transmits a first and second signal therefrom, wherein the first and second signals are two kinds of digital signal which change or do not change in every time slot. According to the present invention, the first and second signals are modulated respectively to provide a first and second modulated signal, a modulation signal is generated by composing the first and second modulated signal, and the modulation signal is transmitted from the receiver. Also, according to the present invention, the first and second signals are modulated with different phases therebetween so as to invite no major amplitude change of the modulation signal over a short time.

For the embodiment of the present invention, it is preferable that the first and second signals are modulated by using QPSK modulation method.

According to a preferred embodiment of the present invention, the first signal is a data signal, and the second signal is a strobe signal which does not change in every time slot when the data signal changes in every time slot, or changes in every time slot when the data signal does not change in every time slot.

For the embodiment of the present invention, it is preferable that the first and second signals are modulated by using QPSK modulation method.

According to another preferred embodiment of the present invention, the first signal is a data signal and the second signal is an exclusive-or of the data signal and a clock signal.

For the embodiment of the present invention, it is preferable that the first and second signals are modulated by using QPSK modulation method.

BRIEF DESCRIPTION OF THE DRAWINGS

The foregoing and other objects, features and advantages of the present invention will be better understood from the following description taken in connection with the accompanying drawings, in which:

FIG. 7 is a graph depicting the signal points of the modulation signal of the second embodiment.

DESCRIPTION OF THE PREFERRED EMBODIMENTS

Embodiments of the present invention will now be described with reference to the accompanying drawings. The drawings roughly depict each composing element only to help understand the present invention. In each embodiment the same composing elements are denoted by the same numerals.

[First Embodiment]

Figure 1A:
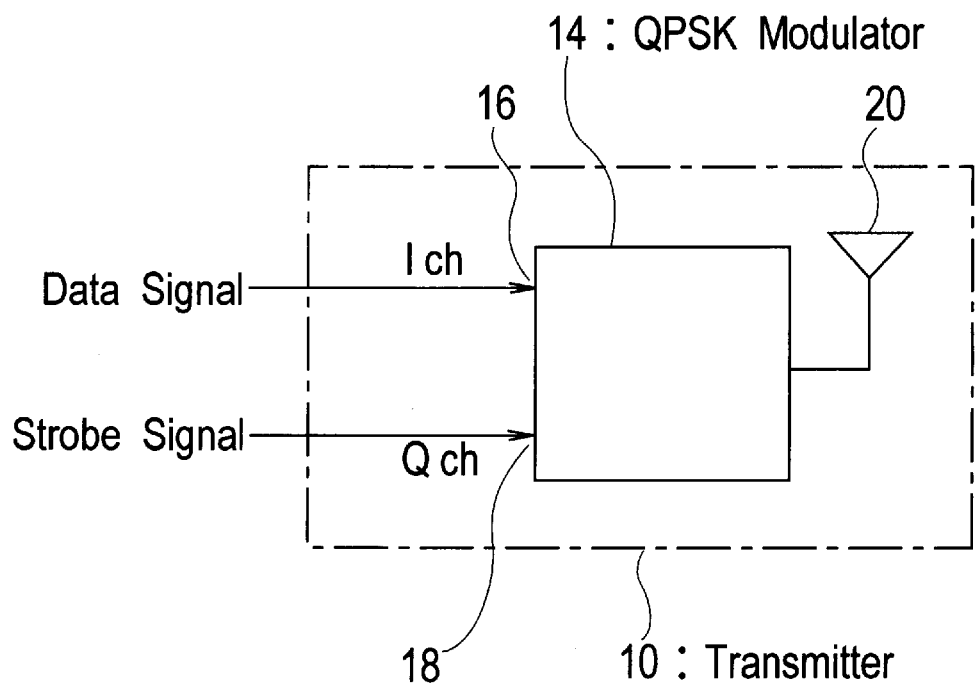
FIG. 1 (including FIGS. 1A and 1B) is a block diagram depicting the configuration of a signal transmission equipment of the first embodiment.
Figure 1B:
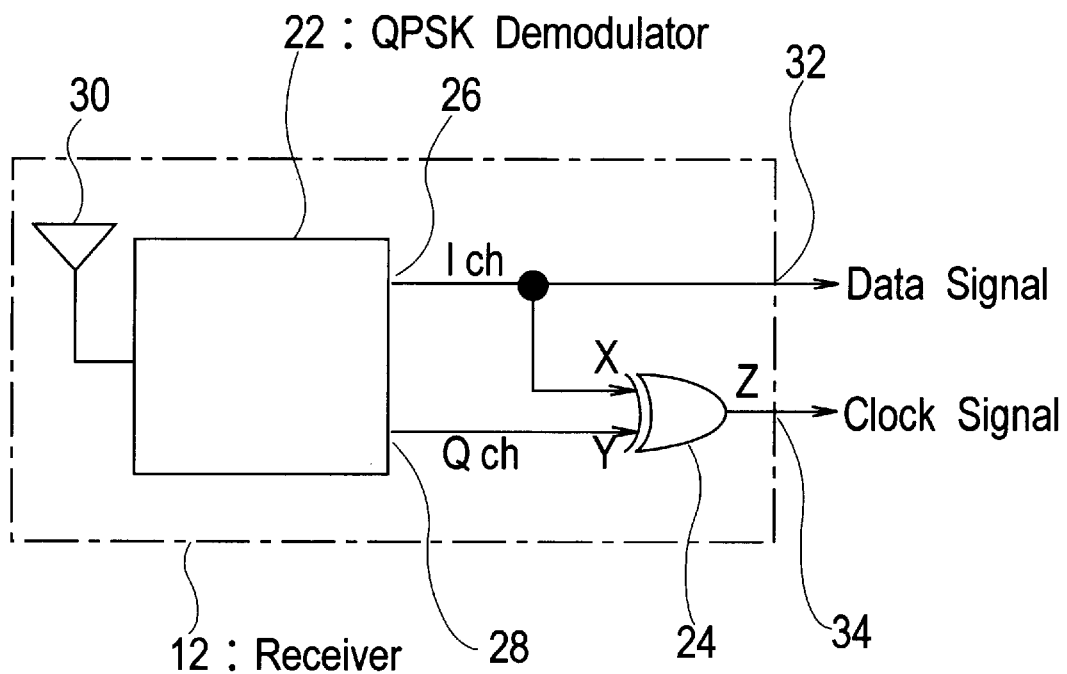

FIG. 1 is a block diagram depicting the configuration of a signal transmission equipment of the first embodiment. FIG. 1A shows a transmitter 10 constituting the signal transmission equipment of the first embodiment. FIG. 1B shows a receiver 12 constituting the signal transmission equipment of the first embodiment.

The above mentioned transmitter 10 is composed of a QPSK modulator 14. The QPSK modulator 14 has an I channel side input port 16 and a Q channel side input port 18. The QPSK modulator 14 has a transmission antenna 20.

In this embodiment, a first signal, that is, a data signal, for example, is input to the I channel side input port 16 of the QPSK modulator 14 as an I signal. Also a second signal, that is, a strobe signal, for example, is input to the Q channel side input port 18 of the QPSK modulator 14 as a Q signal. The QPSK modulator 14 executes orthogonal phase modulation for the data signal and strobe signal to be input, generates a modulation signal, including 2-bit digital information per time slot (unit time), and outputs the modulation signal. This modulation signal is irradiated into the air as electromagnetic waves via a transmission antenna 20 disposed on the QPSK modulator 14.

The above mentioned receiver 12 comprises a QPSK demodulator 22 and an exclusive-or circuit 24. The QPSK demodulator 22 has an I channel side output port 26 and a Q channel side output port 28. The QPSK demodulator 22 also has a receiving antenna 30. The exclusive-or circuit 24 has two input ports, X and Y, and one output port Z. The I channel side output port 26 of the QPSK demodulator 22 is connected to the first output port 32 of the receiver 12 and one input port X of the exclusive-or circuit 24. The Q channel side output port 28 of the QPSK demodulator 22 is connected to the other input port Y of the exclusive-or circuit 24. The output port Z of the exclusive-or circuit 24 is connected to the second output port 34 of the receiver 12.

The above mentioned QPSK demodulator 22 receives radio waves (modulation signals) transmitted from the transmitter 10 by the receiving antenna 30. The QPSK demodulator 22 regenerates the data signal and the strobe signal from the orthogonally phase modulated modulation signal. The data signal is output to the I channel side output port 26 of the QPSK demodulator 22, and the strobe signal is output to the Q channel side output port 28 of the QPSK demodulator 22. The data signal and strobe signal are input to the input ports X and Y of the exclusive-or circuit 24 respectively. The exclusive-or circuit 24 executes exclusive-or processing for the data signal and strobe signal, and outputs a third signal, that is, a clock signal, for example, to the output port Z. The data signal and clock signal are output from the output ports 32 and 34 of the receiver 12.

Figure 2:
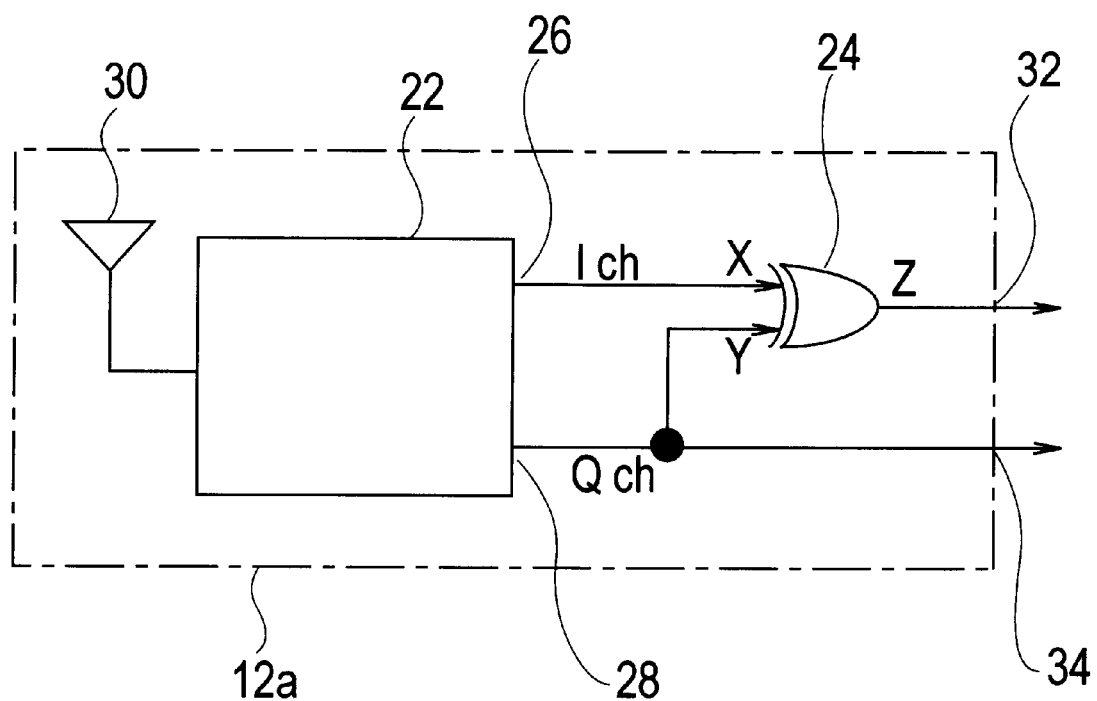
FIG. 2 is a block diagram depicting a variant form of the receiver.

The data signal may be input to the Q channel side input port 18 of the QPSK modulator 14 and the strobe signal may be input to the I channel side input port 16 of the QPSK modulator 14 at the transmitter 10 side. In this case, the configuration of the receiver must be changed as the receiver 12a in FIG. 2 shows.

That is, in the receiver 12a, the I channel side output port 26 of the QPSK demodulator 22 is connected to one input port X of the exclusive-or circuit 24. The Q channel side output port 28 of the QPSK demodulator 22 is connected to the second output port 34 of the receiver 12 and the other input port Y of the exclusive-or circuit 24. The output port Z of the exclusive-or circuit 24 is connected to the first output port 32 of the receiver 12.

Figure 3:
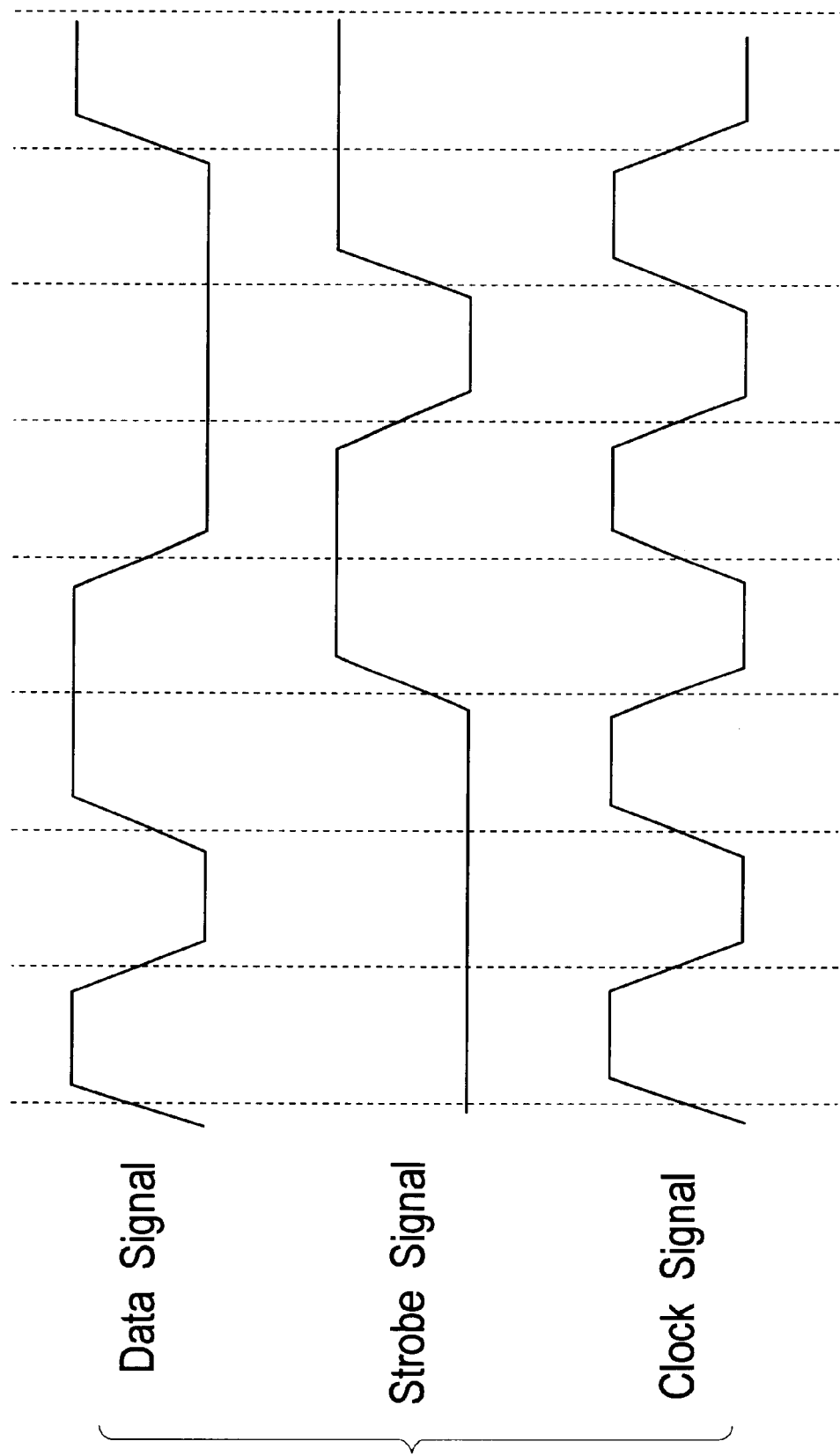
FIG. 3 is a graph depicting signal waveforms.

Operation of the signal transmission equipment of the first embodiment will now be explained with reference to FIG. 3. FIG. 3 shows the waveforms of signals which are handled by the DS-Link system which is used in the IEEE-1394 standard. In FIG. 3, the waveforms of a data signal, strobe signal and clock signal are shown from the top to down. The data signal is a signal which includes digital information to be transmitted. The strobe signal is a signal having a characteristic where no change occurs if the data signal changes, with change occurring if the data signal does not change. In other words, a change of the value of the digital information which the data signal has, and a change of the value of the digital information which the strobe signal has, occurs non-simultaneously. Therefore if the exclusive-or of the data signal and the strobe signal is determined at the receiver 12 side, the clock signal synchronizing with the transmitter 10 side can easily be generated.

As FIG. 3 shows, a value of the clock signal changes in every time slot. When the clock signal and the strobe signal are compared, the strobe signal clearly has a small ratio of change of the signal within the same time. In other words, the strobe signal has more low frequency components than the clock signal. Therefore, the strobe signal is influenced less by band restrictions than the clock signal. In this example, not only the strobe signal but also the data signal are used for the transmission of the clock signal, so resistance to noise increases compared with the case of when the clock signal is transmitted by one signal.

Figure 4:
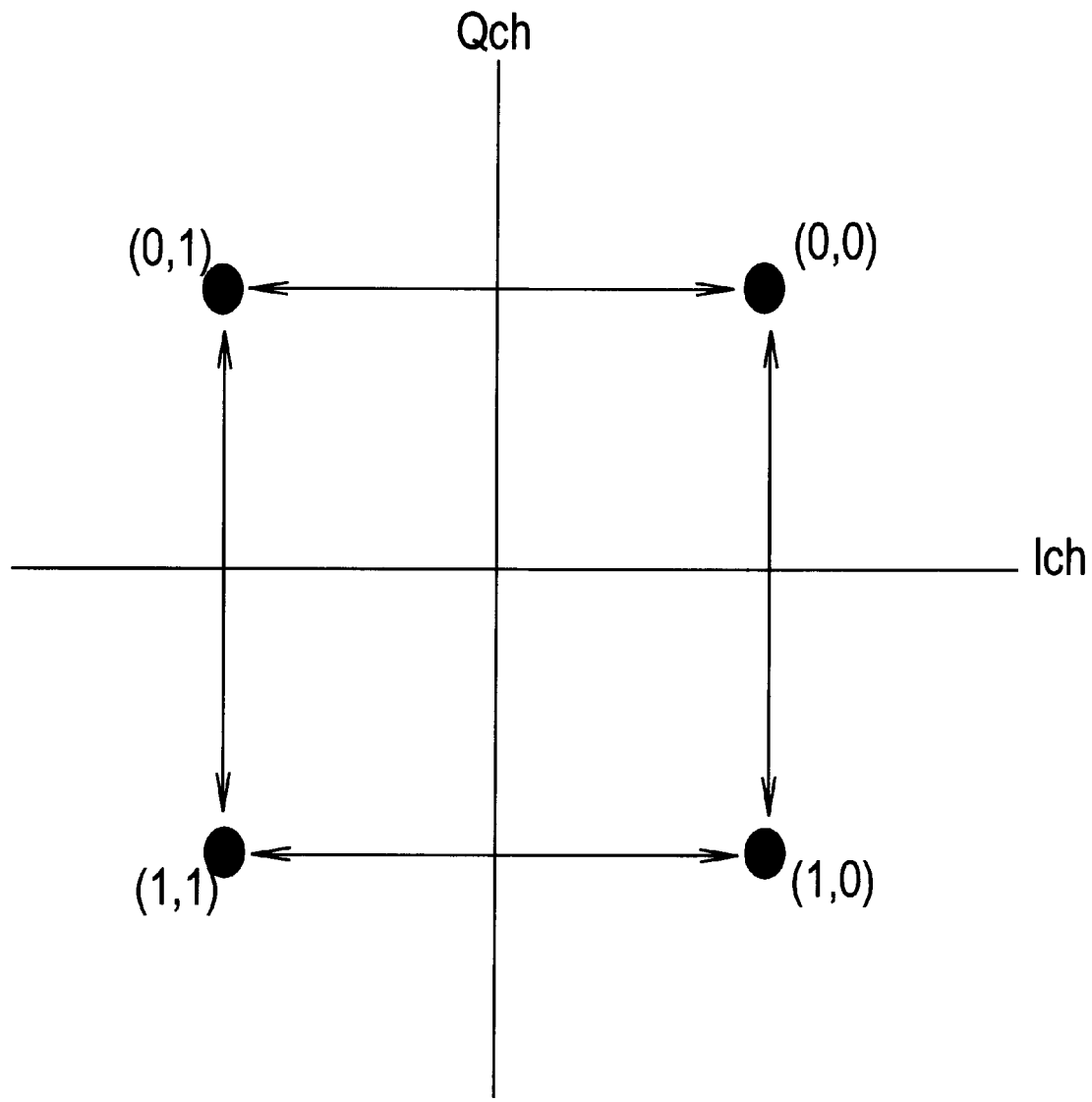
FIG. 4 is a graph depicting the signal points of the modulation signal of the first embodiment.
Figure 5:
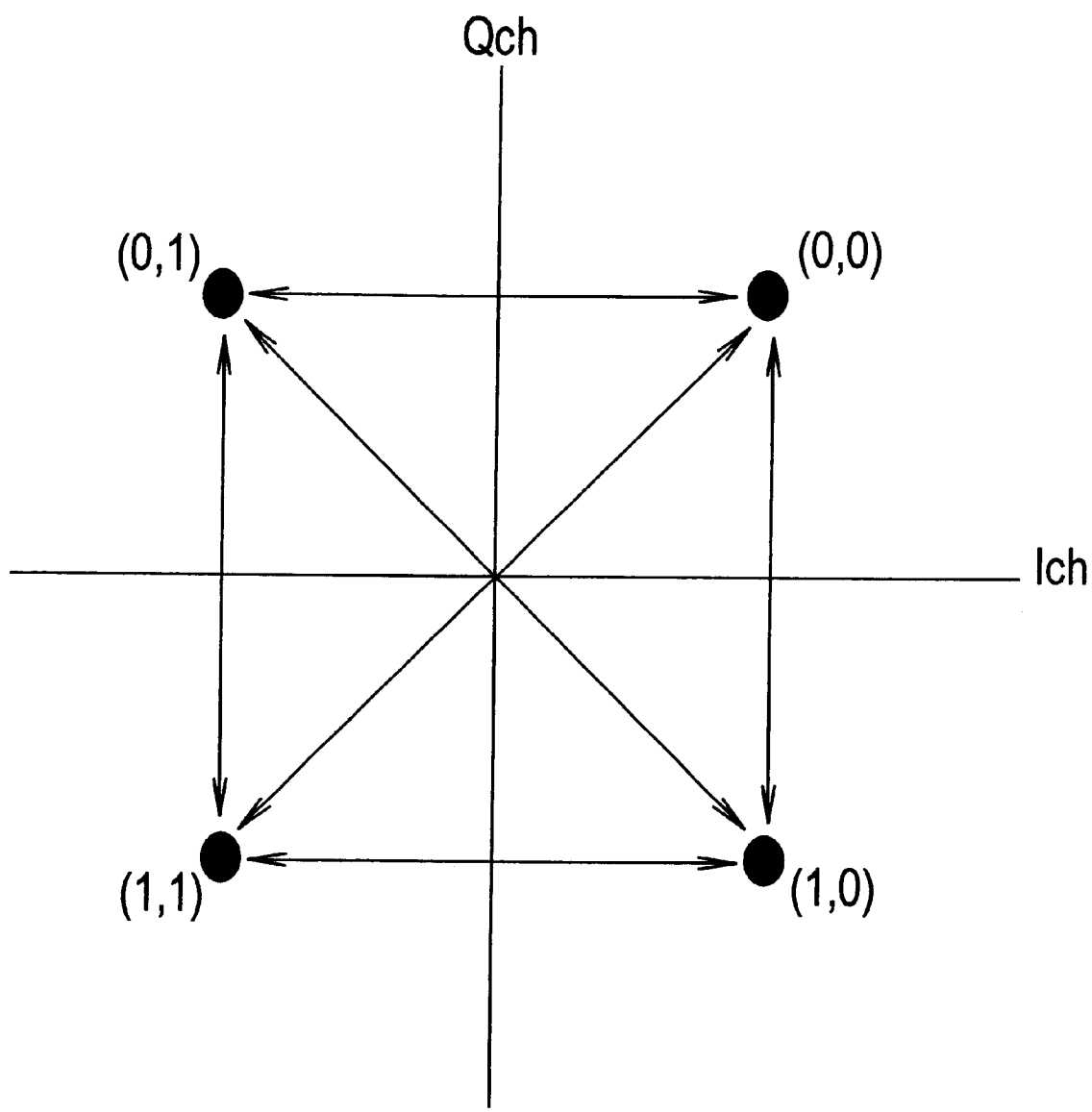
FIG. 5 is a graph used to explain the problems of conventional equipment.

FIG. 4 shows signal points of the modulation signal which is transmitted from the transmitter 10. In the phase diagram (constellation) in FIG. 4, the true axis (Ich) denotes a level of the data signal, and the false axis (Qch) denotes a level of the strobe signal. In the phase diagram, signal points (0, 0), (0, 1), (1, 1) and (1, 0) are positioned in the first quadrant to the fourth quadrant respectively in this sequence. That is, the signal points are positioned according to the Gray code. The arrow marks in the phase diagram denote a change of the signal points when the content of the signal changes. Since the data signal and strobe signal do not change simultaneously, as shown in FIG. 3, a shift of a signal point crossing the origin, as shown in FIG. 5, does not occur in the phase diagram in FIG. 4.

Since the shift of the signal points crossing the origin does not occur on the constellation in this way, no major amplitude change of the modulation signal exists over a short time. This means that there is little influence on transmission quality even if the linear characteristics of the transmitter and receiver are insufficient. This also means that a circuit design with good power efficiency is possible. No major changes of amplitude also means that less high frequency components are included in the modulation signal, which indicates that the deterioration of transmission quality due to band restrictions decreases.

[Second Embodiment]

Figure 6A:
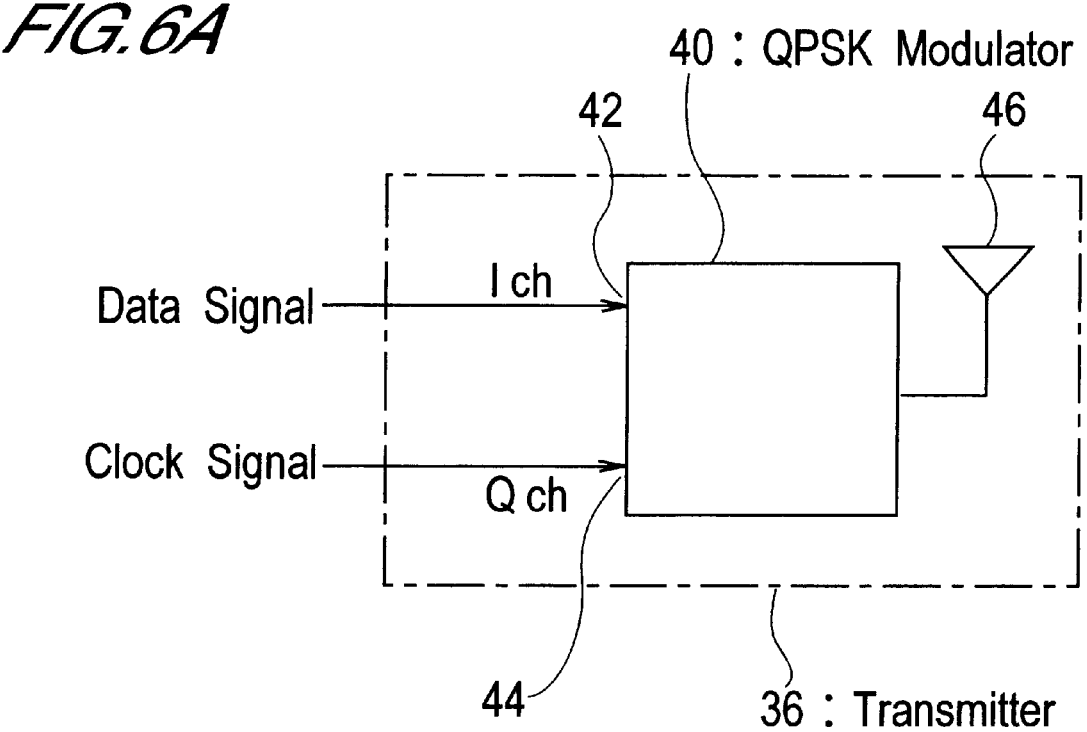
FIG. 6 (including FIGS. 6A and 6B) is a block diagram depicting the configuration of a signal transmission equipment of the second embodiment.
Figure 6B:
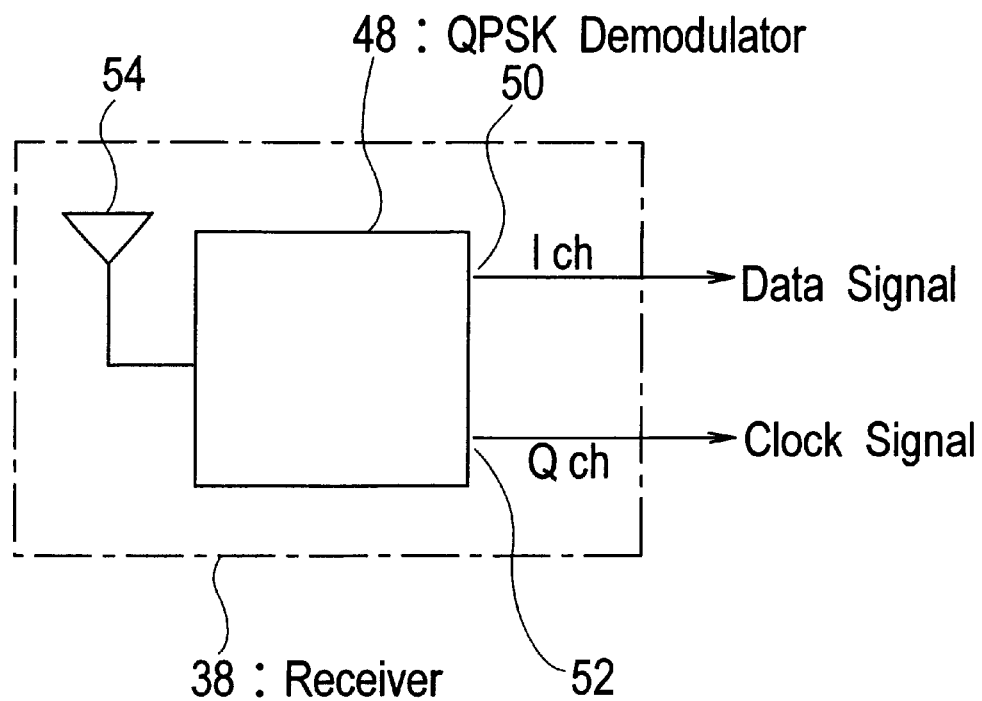

FIG. 6 is a block diagram depicting the configuration of a signal transmission equipment of the second embodiment. FIG. 6A shows a transmitter 36 constituting the signal transmission equipment of the second embodiment. FIG. 6B shows a receiver 38 constituting the signal transmission equipment of the second embodiment.

In the first embodiment, the equipment which generates a modulation signal from the data signal and strobe signal and transmits the modulation signal was explained, now in the second embodiment, equipment which generates a modulation signal from the data signal and clock signal and transmits the modulation signal will be explained.

The above mentioned transmitter 36 comprises a QPSK modulator 40. This QPSK modulator 40 has an I channel side input port 42 and a Q channel side input port 44. The QPSK modulator 40 has a transmission antenna 46.

In this embodiment, a first signal, that is, a data signal, for example, is input to the I channel side input port 42 of the QPSK modulator 40 as an I signal. Also a second signal, that is, a clock signal, for example, is input to the Q channel side input port 44 of the QPSK modulator 40 as a Q signal. The QPSK modulator 40 executes orthogonal phase modulation for the data signal and clock signal to be input, generates a modulation signal, including 2-bit digital information per time slot (unit time), and outputs the modulation signal. This modulation signal is irradiated into the air as electromagnetic waves via a transmission antenna 46 disposed on the QPSK modulator 40.

The above mentioned receiver 38 comprises a QPSK demodulator 48. This QPSK demodulator 48 has an I channel side output port 50 and a Q channel side output port 52. The QPSK demodulator 48 also has a receiving antenna 54.

The above mentioned QPSK demodulator 48 receives radio waves (modulation signals) transmitted from the transmitter 36 by the receiving antenna 54. The QPSK demodulator 48 regenerates the data signal and clock signal from the orthogonally phase modulated modulation signal. The data signal is output to the I channel side output port 50 of the QPSK demodulator 48, and the clock signal is output to the Q channel side output port 52 of the QPSK demodulator 48.

And the above mentioned QPSK modulator 40 and the QPSK demodulator 48 use the positions of signal points which are different from normal arrangement. That is, in the phase diagram (constellation), the abscissa (Ich) denotes a level of the data signal and the ordinate (Qch) denotes a level of the clock signal, as shown in FIG. 7. Signal points (0, 0), (0, 1), (1, 0) and (1, 1) are positioned in the first quadrant to the fourth quadrant sequentially as binary numbers in the phase diagram. That is, the signal point (0, 0) is positioned in the first quadrant, the signal point (0, 1) is positioned in the second quadrant, the signal point (1, 0) is positioned in the third quadrant, and the signal point (1, 1) is positioned in the fourth quadrant. Therefore the signal points of the modulation signal which is output from the QPSK modulator 40 are positioned as shown in FIG. 7.

The arrow marks in the phase diagram in FIG. 7 denote a change of the signal points when the content of the signal changes. Since the signal points are positioned as mentioned above, a shift of a signal point crossing the origin does not occur. In other words, a value of the clock signal does not cause such a change as 0→0 or 1→1, but always changes in the sequence of 0→1→0→1, therefore a signal point does not cross the origin of the constellation regardless how the value of the data signal changes.

As a consequence, in the case of the signal transmission equipment of the second embodiment, transmission quality is little influenced even if the linear characteristics of the transmitter and receiver are insufficient, just as in the first embodiment. The deterioration of transmission quality due to band restrictions also decreases.

[Third Embodiment]

Figure 8:
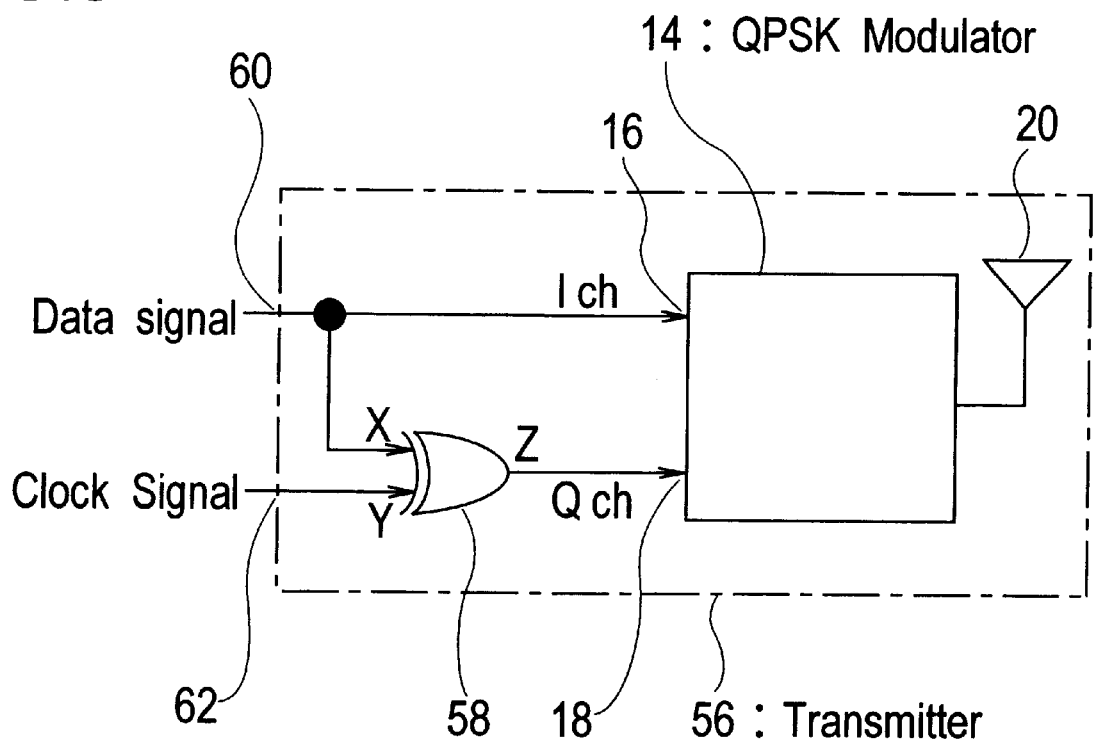
FIG. 8 is a block diagram depicting the configuration of a signal transmission equipment of the third embodiment.

FIG. 8 is a block diagram depicting the configuration of a signal transmission equipment of the third embodiment. FIG. 8 shows a transmitter 56 constituting the signal transmission equipment of the third embodiment. In the signal transmission equipment of the third embodiment, a receiver similar to the receiver 12 (FIG. 1A) explained in the first embodiment is used. Therefore in the third embodiment, explanation on the receiver is omitted.

The above mentioned transmitter 56 comprises a QPSK modulator 14 and an exclusive-or circuit 58. The QPSK modulator 14 has an I channel side input port 16 and a Q channel side input port 18. The QPSK modulator 14 has a transmission antenna 20. The exclusive-or circuit 58 has two input ports, X and Y, and one output port Z. The first input port 60 of the transmitter 56 is connected to the I channel side input port 16 of the QPSK modulator 14 and one input port X of the exclusive-or circuit 58. The second input port 62 of the transmitter 56 is connected to the other input port Y of the exclusive-or circuit 58. The output port Z of the exclusive-or circuit 58 is connected to the Q channel side input port 18 of the QPSK modulator 14.

In this embodiment, a first signal, that is, a data signal, for example, is input to the first input port 60 of the transmitter 56. Also a second signal, that is, a clock signal, for example, is input to the second input port 62 of the transmitter 56. Therefore the data signal and clock signal are input to the input ports X and Y of the exclusive-or circuit 58 respectively. The exclusive-or circuit 58 executes exclusive-or processing for the data signal and clock signal, and outputs a third signal, that is, a strobe signal, for example, to the output port Z.

Therefore the data signal is input to the I channel side input port 16 of the QPSK modulator 14 as an I signal. Also the strobe signal is input to the Q channel side input port 18 of the QPSK modulator 14 as a Q signal. The QPSK modulator 14 executes orthogonal phase modulation for the data signal and strobe signal to be input, generates a modulation signal, including 2-bit digital information per time slot (unit time), and outputs the modulation signal. This modulation signal is irradiated into the air as electromagnetic waves via a transmission antenna 20 disposed on the QPSK modulator 14.

Therefore the signal points of the modulation signal transmitted from the transmitter 56 are positioned as shown in FIG. 4. Since the data signal and strobe signal do not change simultaneously, as mentioned above, the shift of a signal point of the modulation signal, which is transmitted from the transmitter 56, crossing the origin, does not occur.

As a consequence, in the case of the signal transmission equipment of the third embodiment, transmission quality is little influenced even if the linear characteristics of the transmitter and receiver are insufficient just as in the first embodiment. The deterioration of transmission quality due to band restrictions also decreases.

In the above mentioned embodiments, radio transmission using an antenna is used as an example, but signal transmission of the present invention is, of course, not restricted by radio transmission. That is, any medium suitable for the transmission of digital signals can be used, and modulation signals may be transmitted from the transmitter to the receiver by, for example, optical fibers.

As explained above, according to the signal transmission equipment of the present invention, power efficiency can be improved without sacrificing the reliability of signal transmission.

What is claimed is:

1. A transmitter comprising a modulator that generates a modulation signal composed of a first modulated signal and a second modulated signal, the modulator including
    means for receiving a digital data signal;
    means for receiving a digital strobe signal, the digital data signal and the digital strobe signal each having values that are changeable in successive time slots; and
    means for modulating the received data signal at a first phase so as to generate the first modulated signal and modulating the received strobe signal at the second phase different than the first phase, so as to introduce no major amplitude changes in the modulation signal over any short period of time, wherein in every time slot that the received data signal changes, the received strobe signal does not change, and the received strobe signal changes in every time slot that the received data signal does not change.

2. A transmitter according to claim 1, wherein the modulator modulates the data signal and the strobe signal using QPSK modulation.

3. A transmitter according to claim 1, further comprising means producing the strobe signal from the data signal and a clock signal.

4. A transmitter that transmits a digital data signal and a digital strobe signal, each having values that are changeable in successive time slots, the transmitter comprising an EX-OR processor that EX-OR processes the data signal and a clock signal to produce the strobe signal therefrom, and a modulator that generates a modulation signal composed of a first modulated signal and a second modulated signal, the modulator modulating the data signal at a first phase so as to generate the first modulated signal and modulating the strobe signal at the second phase different than the first phase, so as to introduce no major amplitude changes in the modulation signal over any short period of time, wherein in every time slot that the data signal changes, the strobe signal does not change, and the strobe signal changes in every time slot that the data signal does not change.

5. A transmitter that transmits a digital data signal and a digital strobe signal, each having values that are changeable in successive time slots, the transmitter comprising:

a modulator; and means, receiving the data signal, for producing the strobe signal from the received data signal and inputting the received data signal and the produced strobe signal to the modulator, wherein the modulator generates a modulation signal composed of a first modulated signal and a second modulated signal, the modulator modulating the data signal at a first phase so as to generate the first modulated signal and modulating the strobe signal at the second phase different than the first phase, so as to introduce no major amplitude changes in the modulation signal over any short period of time, and wherein in every time slot that the data signal changes, the strobe signal does not change, and the strobe signal changes in every time slot that the data signal does not change.

6. A transmitter according to claim 5, wherein the modulator modulates the data signal and the strobe signal using QPSK modulation, and wherein the means producing the strobe signal further receives a clock signal and produces the strobe signal from the received data signal and the received clock signal.

* * * * *